J. J. HILL.
Potato-Digger.
No. 54,724. Patented May 15, 1866.
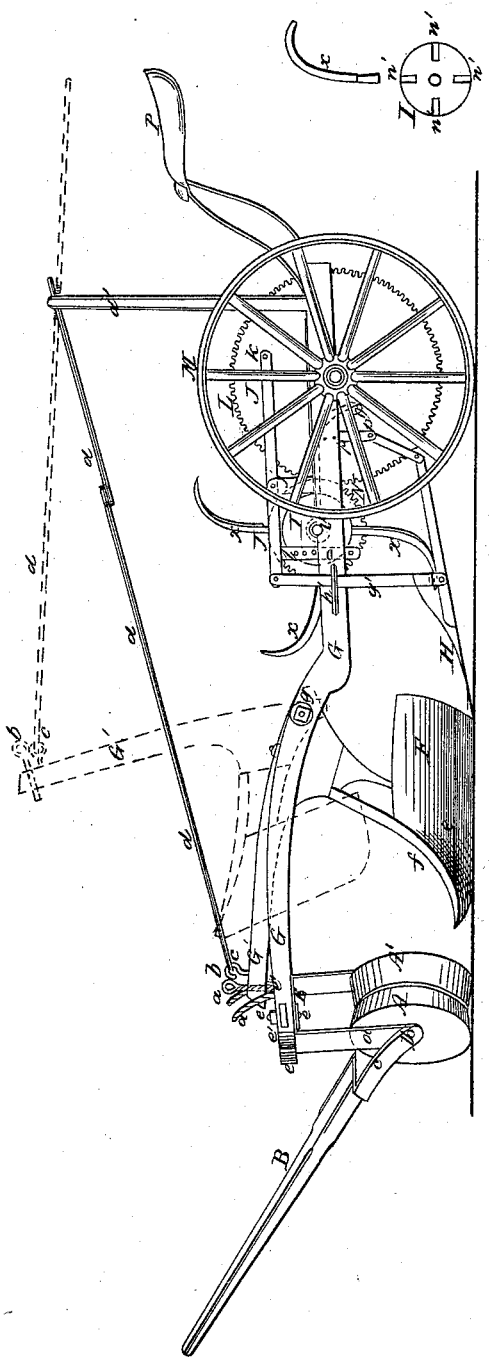
Witnesses:
Ino Johnston
Theodore Long.
Inventor:
J. J. Hill
by his attorney
S. S. Fahnestock

UNITED STATES PATENT OFFICE.

JOSEPH J. HILL, OF XENIA, OHIO.

IMPROVEMENT IN POTATO-HARVESTERS.

Specification forming part of Letters Patent No. 54,724, dated May 15, 1866.

*To all whom it may concern:*

Be it known that I, JOSEPH J. HILL, of Xenia, Greene county, in the State of Ohio, have invented a new and Improved Potato Digger or Harvester; and I do hereby declare that the following is a full and exact description thereof, reference being had to the accompanying drawings, and to the letters of reference marked thereon, like letters indicating like parts in the several figures.

The nature of my invention consists in certain alterations and improvements in the invention patented to me August 22, 1865, varying therefrom principally in having the front roller in two pieces, adjusting the plow and cutter behind so it can be raised, and making the digging-shovel more readily controllable, both these latter to be regulated at the will of the driver, seated behind.

In my patent referred to I hitched to a clevis attached to main frame. I now hitch my horse or horses to a shaft or tongue connected with axis of my compound roller, which consists of two cylinders, which I prefer should taper slightly inward, making frustums of cones each.

These rollers are indicated by A A'. The object of hitching directly to them and having two is that in turning the movement may be made the more easily, one turning forward as the other one does backward.

B is the tongue. C is the connection with axis D of rollers. The axis of roller passes also through another vertical iron piece, $d'$, attached to a fifth-wheel, E, above. It revolves upon a bolt, $e$, passing through it, and a circular wooden piece, $e'$, covering it above, which secures the two ends of the frame G. On this piece $e'$ rests the front end of the plow-beam G'. Two guide-pins, $a$, serve to locate the front end of the beam. A set-screw, $b$, passes through the front end of beam to work upon $e'$, and raise or lower the beam or the plow behind. A hook, $c$, is also attached to front end of beam, and a rod, $d$, connecting therewith, extends back to the driver, resting on the top of a standard, $d'$, within his reach.

F is a double mold-board plow having a sharp colter, $f$, in front to cut the vines after the rollers in front have pressed them down.

The plowshares $e\ e$ remove or throw aside vines and earth above the potatoes in the rows, the set-screw on front end of beam regulating the depth of the plow. This prepares the hill for the open or grated shovel H behind, similar to the one I before used. In this, as in the former case, the teeth $x$, secured to revolving cylinder I, pass between those of the digging-shovel H. The rear end of the shovel is hinged to the lower end of pendants $p$ at $p'$, the pendants being secured in any suitable way to rear end of frame G. I omitted saying the rear end of the plow-beam is hinged to frame G at $g$.

Passing upward from front end of shovel are two curved-shaped irons, $g'$, passing through guide-irons $h'$, fastened to sides of frame G. Passing back from top of these irons $g'$ are two bars, J, pivoted to tops of fixed standards $j$. The rear ends of these bars J are connected by a cross-piece, K, within reach of the driver's feet, and pressing upon which with them he can raise the digging-shovel H and clear it above the ground. An adjustable rest, $l$, between the pivot-piece $j'$ and curved iron $g'$, serves to regulate the depth the shovel shall enter the ground.

Attached to one of the wheels M, I have a cog-wheel, L, gearing into one, N, secured to the axis of the toothed cylinder I, giving motion to said teeth, which pick up the potatoes which are raised by the shovel, delivering them in the rear on the top of the ground, where they can readily be gathered, at same time freeing them from dirt before they are dropped.

My toothed cylinder is made up of vertical sections or disks with dovetailed recesses $n'$, or mortises with pins for the teeth constructed in this manner. It is very easy to replace any broken teeth by taking the cylinder out of its boxes, unscrewing a jamming-nut, $t'$, which holds all together, loosening the several sections, take out a broken tooth, and replace it by a new one, tighten up sections again by nut, and the repair is thus readily made and tooth better secured than in any other way. This I deem an important feature of the invention. If the frame of the machine be sufficiently wide it will not be necessary to remove cylinder from it in order to replace a tooth.

I use such ratchet attachment in my wheels that in backing the toothed cylinder will not revolve.

P is the driver's seat, where he can take hold of rod $d$ to raise the plow in turning or when not passing over a row, as also raise the digging-shovel H under like circumstances, which latter is done by pressing his feet upon cross-bar K connecting the two sides of frame J.

Having thus described my invention, what I claim as new, and desire to secure by Letters Patent of the United States, is—

1. The double or compound rollers A A', constructed and operating as described, in connection with the fifth-wheel, for the purpose set forth.

2. The pivoted and adjustable plow and cutting-colter, constructed and operating substantially as described, and for the purposes set forth.

3. Operating the digging-shovel H through the leverage-frame J J K.

4. Constructing the toothed cylinder I of sections or disks with recesses $n'$, to hold the teeth as described, for the purposes set forth.

J. J. HILL.

Witnesses:
    LEWIS WRIGHT,
    J. M. MILBURN.